United States Patent

Maeda, deceased et al.

[15] 3,704,457

[45] Nov. 28, 1972

[54] DRIVING TECHNIQUE FOR THIN FILM MEMORY ELEMENTS

[72] Inventors: Hisao Maeda, deceased, late of Tokyo-to, Japan by Hisaaki Maeda, heir; Takashi Sakuma; Keisuke Kobayashi, both of Tokyo-to, Japan

[73] Assignee: Toko Kabushiki Kaisha, Tokyo-to, Japan

[22] Filed: Jan. 19, 1970

[21] Appl. No.: 3,601

Related U.S. Application Data

[63] Continuation-in-part of Ser. No. 614,667, Feb. 8, 1967, abandoned.

[30] Foreign Application Priority Data

Feb. 11, 1966 Japan ........................41/8132

[52] U.S. Cl..340/174 PW, 340/174 M, 340/174 QA, 340/174 TF, 340/174 WC

[51] Int. Cl..........................G11c 11/04, G11c 11/14

[58] Field of Search.................................340/174 TF

[56] References Cited

UNITED STATES PATENTS

| | | | |
|---|---|---|---|
| 3,387,289 | 6/1968 | Walter | 340/174 TF |
| 3,422,408 | 1/1969 | Turczyn | 340/174 PW |

OTHER PUBLICATIONS

Publication I, IBM Technical Disclosure Bulletin, Vol. 9, No. 1, June 1966, pp. 73–74.

*Primary Examiner*—James W. Moffitt
*Attorney*—Marmorek & Bierman

[57] ABSTRACT

A method of driving a memory device having a matrix memory consisting of information wires provided respectively with magnetic thin film and to be applied with information pulse currents and word conductor wires crossing perpendicularly with said information wires and to be applied with word pulse currents; in which both of writing-in of informations "1" and "0" are carried out, respectively, by first and second bipolar information pulse currents which are different in only their polarities.

12 Claims, 11 Drawing Figures

INVENTORS:
BY Hisao Maeda, deceased, by Hisaaki Maeda, heir of the estate, Takashi Sakuma and Keisuke Kobayashi
By Marmorek & Bierman
Their Attorneys.

INVENTORS:
Hisao Maeda, deceased,
by Hisaaki Maeda, heir
BY of the estate,
Takeshi Sakuma and
Keisuke Kobayashi;
by Marmorek & Bierman,
Their Attorneys.

DRIVING TECHNIQUE FOR THIN FILM MEMORY ELEMENTS

CROSS-REFERENCE TO RELATED APPLICATION

This application is a continuation-in-part of our copending application Ser. No. 614,667, filed Feb. 8, 1967 and now abandoned, entitled "DRIVING TECHNIQUE FOR THIN FILM MEMORY ELEMENTS."

BACKGROUND OF THE INVENTION

The present invention relates to improved methods of driving a memory device having a matrix memory consisting of information wires provided respectively with magnetic thin film and to be applied with information pulse currents and word conductor wires crossing perpendicularly with said information wires and to be applied with word pulse currents.

Methods of driving memory device mentioned above which have been known heretofore are accompanied by certain problems principally in case where rapid repeated writing is required, the principal problem being the disturbance of an information bit stored in a certain storage point by a reverse information pulse current for writing at another storage point on the same information line, as described more fully hereinafter in connection with FIGS. 1 to 3.

Furthermore, in U.S. Pat. No. 3378821 patented on Apr. 16, 1968, there is shown a method of driving a memory device, in which a bipolar information pulse current is used for writing-in of an information "1" for the purpose of eliminating the disadvantage mentioned above, but this known method has the following disadvantages because of using a single pulse for writing another information "0." a. Advantage due to bipolar information pulse current for "1" cannot be obtained at all in the case of writing in an information "0."

b. Two different kinds of devices for applying different information pulse current for "1" and "0" are necessary.

SUMMARY OF THE INVENTION

It is therefore an essential object of the invention to provide an improved driving method whereby the problems encountered in the known art can be overcome.

More specifically, the object of the invention is to provide method of driving a matrix memory device, whereby a high output voltage and extremely stable operation can be obtained, and a high allowable value of the information pulse current can be used in both cases of writing-in of an information "1" and another information "0."

The forgoing objects and other objects of the present invention as well as the characteristic features of the invention will become more apparent and readily understandable by the following description and the appended claims when read in conjunction with the accompanying drawings, in which the same or equivalent members are designated by same reference characters and numerals.

DETAILED DESCRIPTION OF THE INVENTION

Figure 1:
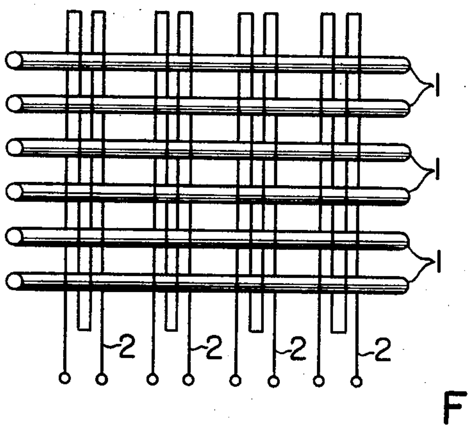
FIG. 1 is a schematic planar view showing one example of a matrix type memory element in which information wires provided respectively with magnetic thin film wires are used.
Figure 2:
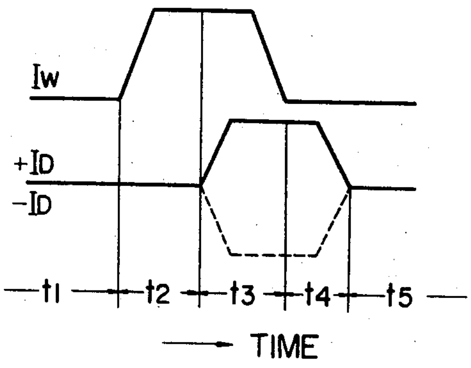
FIG. 2 PRIOR ART
FIG. 2 is a pulse time chart showing pulse timing which indicates the relationship between a word pulse current and an information pulse current in the case of a conventional drive method.
Figure 3:
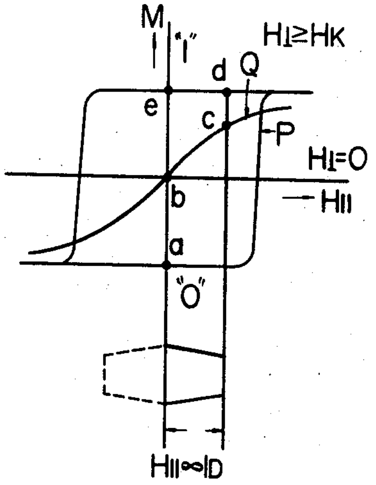
FIG. 3 is a graphical representation indicating the principle of operation in the case illustrated in FIG. 2.

As conducive to a full understanding of the nature and utility of the present invention, the following consideration of a matrix memory device of known type and the operational principle thereof, as well as the problems encountered therein, is first considered with reference to FIGS. 1, 2, and 3.

FIG. 1 shows a matrix memory device consisting of a plurality of information wires 1 provided respectively with magnetic thin film and a plurality of word conductor wires 2 crossing perpendicularly said information wires 1. In general, the magnetization easy axis of said magnetic thin film is taken in the wire circumferential direction and the information wires are used, as information lines as well as sense lines, while the word conductor wires 2 are used as word pulse lines.

Alternatively, when the magnetization easy axis of the wire 1 is taken in the wire axial direction, the wires 1 can be used as word pulse lines, and the word conductor wires 2 can be used as information and sense lines. However, for the purposes of the following disclosure, the description will be confined to the former, general case.

FIG. 2 indicates the time relationship between a word pulse current $I_W$ passed through a word conductor wire 2 and an information pulse current $I_D$ passed through an information wire 1. FIG. 3 is a graphical representation of the operational principle indicating the manner in which the magnetization characteristics of the magnetic thin film of the information wire 1 is caused to vary by the currents indicated in FIG. 2.

More specifically, the B–H curve of the magnetic thin film of the wire 1 with respect to the magnetic field strength $H_{11}$ in the magnetization easy axis is caused to be as indicated by curve P in FIG. 3. Furthermore, the B–H curve corresponding to the state wherein a magnetic field strength $H_t$ in the magnetization hard axis direction equal to or greater than the anisotropic magnetic field strength $H_K$ of the magnetic thin film is applied is caused to be as indicated by curve Q in FIG. 3.

The magnetic fields of strengths $H_{11}$ and $H_t$ are respectively produced by currents $I_D$ and $I_W$.

For a consideration of the operation, it will be assumed that a binary digit "0" is stored in an element in FIG. 3. That is, in the period $t_1$ indicated in FIG. 2, the magnetization M of the element is in a residual state at a negative point (a) shown in FIG. 3. In the succeeding time period $t_2$, the word pulse current $I_W$ is applied, and, as a result, the magnetic field of strength $H_t$ in the magnetization hard axis direction is produced. Since during this time period $t_2$, the information pulse current $I_D$ is not flowing, the strength $H_{11}$ of the magnetic field in the magnetization easy axis direction is zero. Furthermore, the magnetization during this time period is transferred from point (a) to point (b) and is reduced in magnitude. This reduction in the magnitude of the magnetization M causes an output voltage to be induced in the information wire.

Next, when the information pulse current $I_D$ is applied in the succeeding time period $t_3$, a magnetic field of strength $H_{11}$ is produced, and the magnetization M is transferred from point (b) to point (c). Then, during the time period $t_4$, the field strength $H_t$ becomes zero, and only the field of strength $H_t$ is applied, in which state the magnetization M shifts to point (d). Finally, in the time period $t_5$, the magnetization M shifts to point (e), whereupon the writing-in of the binary digit "1" is completed.

While the reading-out of the digit "1" and the writing-in of the digit "0" can be accomplished in a similar manner, the polarity of the information pulse current $I_D$ must, of course, be in the reverse direction as indicated by dotted line in FIG. 2.

An ordinary drive method of the above description is accompanied by the following problem. An information bit written in at a certain information storage point is disturbed by the reverse information pulse current for writing in at another information storage point on the same information wire, whereby the memory characteristic of the information thus stored at the first storage point is disturbed. This disturbance phenomenon will be more fully apparent from the result of an experiment with a non-destructive memory element as described below.

Figure 5:
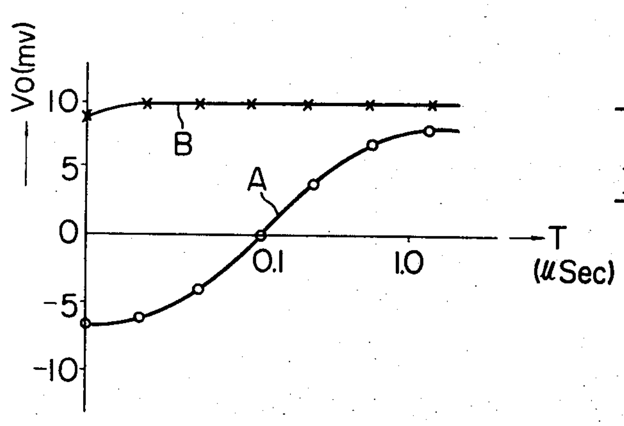
FIG. 5 is a graphical representation indicating a comparison between output characteristics in the case of conventional drive method and that of the drive method of the present invention.

In the case where an information wire is used for the information line of a non-destructive memory element, when, by an ordinary method, writing-in of an information, reading-out of the same, application of a reverse information pulse current $I_D$ after T seconds from the instant of said reading-out, and reading-out of the same are successively carried out, the output voltage is different depending on the magnitude of said time T. This experimental result is indicated in FIG. 5 by a curve A which was obtained in an actual instance wherein two layers of magnetic thin film were applied on the information wire. In this case, when $T<0.1 \times 10^{-6}$ seconds, the output voltage $V_o$ was inverted by a reverse pulse current $I_D$ to assume a negative value, and when $T>0.1 \times 10^{-6}$ seconds, the output voltage finally assumed a positive value, its value becoming saturated at $T>1 \times 10^{-6}$ seconds.

As is apparent from the afore-mentioned experimental result, in the case when a memory element with rapid repetition of writing-in is required, there arises the difficulty of the output unavoidably being reduced or inverted, whereby it cannot be used. Although the causes of this phenomenon are still not clearly understood, it is thought to arise because of the following reason.

That is, once the word pulse current $I_W$ is caused to flow for the purpose of reading-out, the magnetization states of large number of memory storage points which have been deflected by said current do not all return to their original states within a very short time even after the word pulse current $I_W$ has become zero.

The above-mentioned disadvantageous problems encountered in known driving methods have been effectively solved by the present invention characterized by that not only writing-in of an information "1," but also writing-in of another information "0" are respectively carried out by at least one bipolar information pulse current consisting of a positive pulse element and a negative pulse element, said two kinds of bipolar information pulse currents for informations "1" and "0" being made reverse in their polarities.

The manner of writing in the information "0" is entirely same as that of writing in the formation "1" and can be easily embodied by merely reversing the polarity of the device of producing bipolar information pulse current for the information "1," the following description of the invention is made in detail in connection with the cases of writing in the information "1" in FIGS. 4(a), 4(b), 4(c), 4(d), 4(e), 4(f) and 4(g). In these FIGS., wave forms of the reverse bipolar information pulse currents ($-I_D$) for writing-in of the information "0" are shown by dotted lines.

In general, for the purpose of accomplishing only writing-in, only the time relationship between the currents within the ranges of $t_3$ and $t_4$ shown in FIG. 2 is required, and the other time ranges of $t_1$, $t_2$ and $t_5$ do not pose a problem.

In the case of the present invention, the information pulse current $I_D$ consists of two bipolar pulses, one of which is a pulse in a direction necessary for writing-in, and the other is a pulse which, relative to the former pulse, is disposed in time in front thereof or therebehind and, moreover, is in the reverse direction.

Figure 4A:
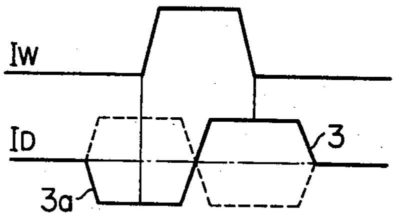
FIGS. 4(a), 4(b), 4(c), 4(d), 4(e), 4(f) and 4(g) are pulse time charts respectively showing pulse timing which indicate the relationships between word pulse currents and information pulse currents in examples of the drive method embodying the invention.

In the case illustrated in FIG. 4(a), the information pulse current $I_D$ to be written consists of a pulse 3 and a pulse 3*a* of opposite direction positioned in front of the pulse 3. The pulse 3*a* has no influence on the writing-in as is apparent from the description set forth hereinabove with respect to FIG. 2.

Figure 4B:
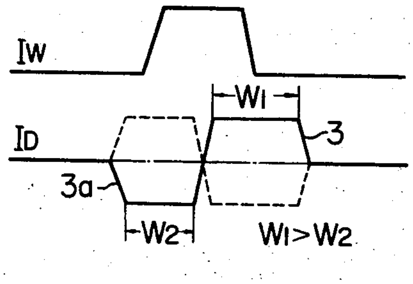

In the separate example illustrated in FIG. 4(b), there is indicated a method of shortening the time for repetitive writing-in by causing the pulse width $W_2$ of the pulse 3*a* which is not necessary for writing-in to be less than the pulse width $W_1$ of the pulse 3 necessary for writing-in.

Figure 4C:
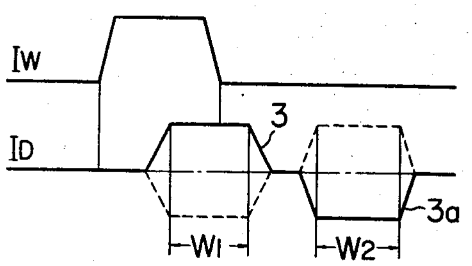
Figure 4D:
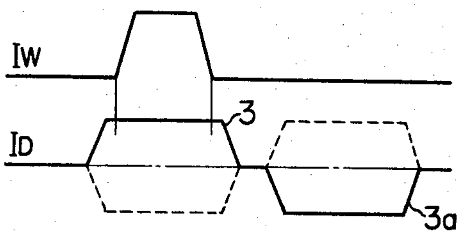
Figure 4E:
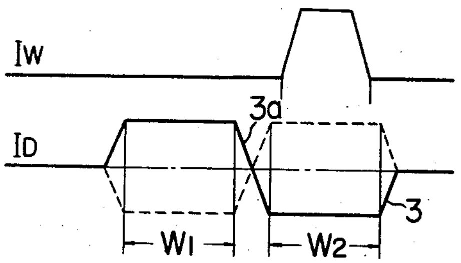

In further examples of the invention as illustrated in FIGS. 4(c), 4(d), and 4(e), writing-in is first accomplished with the pulse 3, and immediately thereafter the pulse 3*a* is passed. If the time relationship is so established that, at the time when the pulse 3*a* is passed, the pulse current $I_W$ is already at zero value, the pulse 3*a* will have no effect whatsoever on the writing-in. In this case, also it is possible to shorten the time of repetitive writing-in causing the pulse width $W_2$ of the pulse 3*a* to be less than the pulse width $W_1$ of the pulse 3. Furthermore, contrary to the above case, if in the illustrations of FIGS. 4(e) and 4(d), pulse width of the pulse 3*a* is made to be larger than that of the pulse 3, the above-mentioned disturbance can be further reduced.

Figure 4F:
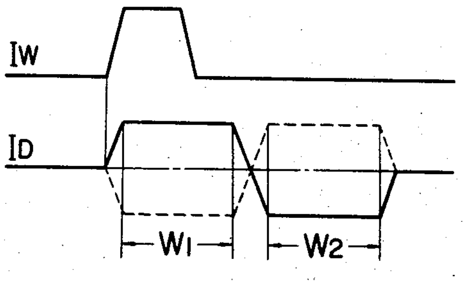

FIG. 4(f) relates to a case adopting the steps of making a word pulse and a positive first preceding information pulse start simultaneously, making said word pulse terminate during the period of time in which said first information pulse is in its stationary state, and applying a second succeeding information pulse having symmetric wave form and reverse polarity with respect to those of said first information pulse upon termination of said first information pulse, thereby to write in an information "1," and applying a bipolar information pulses having polarities reverse to said first and second information pulses, thereby to write in an information "0." In this case also, it is possible to make wave form of the first preceding information pulse asymmetric with respect to that of the second succeeding information pulse. For example, width $W_1$ may be larger than $W_2$.

Figure 4G:
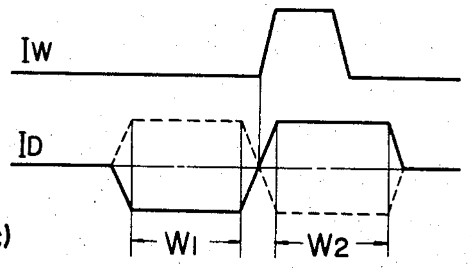

FIG. 4(g) relates to the case of adopting the steps of making a word pulse and a positive second succeeding information pulse start simultaneously, said latter pulse being made to flow upon termination of a first preceding information pulse having symmetric wave form and reverse polarity with respect to those of said second pulse and making said word pulse terminate during the period of time in which said second pulse is in its stationary state, thereby to write in an information "1," and applying a bipolar information pulses having polarities reverse to said first and second information pulses, to write in an information "0." In this case also, it is possible to make wave form of the first preceding information pulse asymmetric with respect to that of the second succeeding information pulse. For example the width $W_1$ may be less than the width $W_2$.

In the cases of FIGS. 4(a), 4(b), 4(c), 4(d) and 4(e), steps of applying information pulse currents are not described in detail, but said steps are same as those of the cases of FIGS. 4(f) and 4(g).

In the description of the steps, the stationary state means the period including the period corresponding to 90 percent of the current amplitude.

An experiment similar to aforementioned experiment by which the curve A of FIG. 5 was obtained was carried out with the method according to the invention in which bipolar pulse current was used as the information pulse current, whereupon a result as indicated by curve B in FIG. 5 was obtained.

It is apparent from FIG. 5 that, in the case of the present invention, there is no disturbance due to reverse information pulse current at another memory storage point. For this reason, the present invention affords the advantages of not only an increase in output voltage but also an extremely stable operation whereby a high allowable value of the information pulse current $I_D$ can be used.

These advantageous features of the invention are attainable not only with respect to non-destructive memories but also with respect to destructive memories.

Furthermore, while the above description relates to the case wherein the bipolar information pulse current consists of a single pair of positive and negative pulses, the present invention can be effectively applied also to the case wherein a plurality of pairs of pulses are used instead of this single pair of pulses.

It will be apparent that the present invention is applicable not only to memory elements in which cylindrical magnetic thin film is used but also to those in which planar or flat magnetic thin film is used.

What we claim is:

1. In a driving method for a memory device comprising a plurality of information wires provided respectively with magnetic thin film and to be applied with information pulse current producing a magnetic field in the direction in which magnetization of said film is easy and a plurality of word conductor wires which are crossed with said information wires and to be applied with word pulse current producing a magnetic field in the direction in which magnetization of said film is difficult; an improvement comprising the steps of applying a word pulse current during the period in which a first preceding information pulse current is flowing in the stationary state and making said word pulse current terminate during the stationary state of said information pulse current, applying a second succeeding information pulse current upon termination of said preceding information pulse current, said second information pulse current being reverse in its polarity and symmetric in its wave form with respect to those of said preceding information pulse current, thereby to write in an information "1," and applying a bipolar information pulse current having polarity reverse to said first and second information pulse currents, thereby to write in an information "0."

2. A method, as claimed in claim 1, in which wave form of the second succeeding information pulse current is made to be asymmetric with respect to that of the first preceding information pulse current.

3. In a driving method for a memory device comprising a plurality of information wires provided respectively with magnetic thin film and to be applied with information pulse current producing a magnetic field in the direction in which magnetization of said film is easy and a plurality of word conductor wires which are crossed with said information wires and to be applied with word pulse current producing a magnetic field in the direction in which magnetization of said film is difficult; an improvement comprising the steps of applying a word pulse current from the time instant prior to application of a first preceding information pulse current, making said word pulse current terminate after said first preceding information pulse current has reached to its stationary state, applying a second succeeding information pulse current upon termination of said preceding information pulse current, said second pulse current being reverse in its polarity and symmetric in its wave form with respect to those of said preceding information pulse current, thereby to write in an information "1," and applying a bipolar information pulse current having polarity reverse to said first and second information pulse currents, thereby to write in an information "0."

4. A method as claimed in claim 3, in which wave form of the second succeeding information pulse current is made to be asymmetric with respect to that of the first preceding information pulse current.

5. In a driving method for a memory device comprising a plurality of information wires provided respectively with magnetic thin film and to be applied with information pulse current producing a magnetic field in the direction in which magnetization of said film is easy and a plurality of word conductor wires which are crossed with said information wires and to be applied with word pulse current producing a magnetic field in the direction in which magnetization of said film is difficult; an improvement comprising the steps of applying a positive second succeeding information pulse current upon termination of a first preceding information pulse current having symmetric wave form and reverse polarity with respect to those of said succeeding current, applying a word pulse current during the period of time in which said second succeeding information pulse current is in its stationary state, making said word pulse current terminate during said stationary state of said second succeeding information pulse current, thereby to write in an information "1," and applying a bipolar information pulse current having polarity reverse to said first and second information pulse currents, thereby to write in an information "0."

6. A method as claimed in claim 5, in which wave form of the first preceding information pulse current is made to be asymmetric with respect to that of the second succeeding information pulse current.

7. In a driving method for a memory device comprising a plurality of information wires provided respectively with magnetic thin film and to be applied with information pulse current producing a magnetic field in the direction in which magnetization of said film is easy and a plurality of word conductor wires which are crossed with said information wires and to be applied with word pulse current producing a magnetic field in the direction in which magnetization of said film is difficult; an improvement comprising the steps of applying a negative first preceding information pulse current having symmetric wave form and reverse polarity with respect to a second succeeding information pulse current, applying a word pulse current during period of time in which said first preceding pulse current is in its stationary state, applying said second succeeding information pulse current upon termination of said first preceding pulse current, making said word pulse current terminate during stationary state of said second succeeding pulse current, thereby to write in an information "1," and applying a bipolar information pulse current having polarity reverse to said first and second information pulse currents, thereby to write in an information " 0."

8. A method as claimed in claim 7, in which wave form of the first preceding information pulse current is asymmetric with respect to that of the second succeeding information pulse current.

9. In a driving method for a memory device comprising a plurality of information wires provided respectively with magnetic thin film and to be applied with information pulse current producing a magnetic field in the direction in which magnetization of said film is easy and a plurality of word conductor wires which are crossed with said information wires and to be applied with word pulse current producing a magnetic field in the direction in which magnetization of said film is difficult; an improvement comprising the steps of making a word pulse current and a first preceding information pulse current start simultaneously, making said word pulse current terminate during the period of time in which said preceding information pulse current is in its stationary state, applying a second succeeding information pulse current upon termination of said preceding information pulse current, said second pulse current having symmetric wave form and reverse polarity with respect to those of said preceding pulse current, thereby to write in an information "1," and applying a bipolar information pulse current having polarity reverse to said first and second information pulse currents, thereby to write in an information "0."

10. A method as claimed in claim 9, in which wave form of the succeeding information pulse current is asymmetric with respect to that of the preceding information pulse current.

11. In a driving method for a memory device comprising a plurality of information wires provided respectively with magnetic thin film and to be applied with information pulse current producing a magnetic field in the direction in which magnetization of said film is easy and a plurality of word conductor wires which are crossed with said information wires and to be applied with word pulse current producing a magnetic field in the direction in which magnetization of said film is difficult; an improvement comprising the steps of making word pulse current and a positive second succeeding information pulse current start simultaneously, said latter pulse current being made to flow upon termination of a first preceding information pulse current having a symmetric wave form and reverse polarity with respect to those of said second pulse current and making said word pulse current terminate during the period of time in which said second pulse current is in its stationary state, thereby to write in an information "1,"and applying a bipolar information pulse current having polarity reverse to said first and second information pulse currents, thereby to write in an information "0."

12. A method as claimed in claim 11, in which wave form of the first preceding information pulse current is asymmetric with respect to that of the second succeeding information pulse current.

* * * * *